United States Patent
Crossley

(10) Patent No.: US 9,673,852 B1
(45) Date of Patent: Jun. 6, 2017

(54) PHONE CASE WITH RETRACTABLE CHARGING SYSTEM

(71) Applicant: Chase Crossley, Greenville, TX (US)

(72) Inventor: Chase Crossley, Greenville, TX (US)

( * ) Notice: Subject to any disclaimer, the term of this patent is extended or adjusted under 35 U.S.C. 154(b) by 0 days.

(21) Appl. No.: 15/152,768

(22) Filed: May 12, 2016

Related U.S. Application Data

(60) Provisional application No. 62/160,470, filed on May 12, 2015.

(51) Int. Cl.
*H04B 1/38* (2015.01)
*H04B 1/3888* (2015.01)
*H04M 1/02* (2006.01)

(52) U.S. Cl.
CPC ........ *H04B 1/3888* (2013.01); *H04M 1/0254* (2013.01); *H04M 1/0274* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,407,048 B2* | 8/2016 | George | ............... | H01R 13/72 |
| 2003/0157973 A1* | 8/2003 | Yang | ............... | H04M 1/15 |
| | | | | 455/569.1 |
| 2013/0020425 A1* | 1/2013 | Grassi | ............... | B65H 75/4431 |
| | | | | 242/388 |
| 2013/0029725 A1* | 1/2013 | Heil-Brice | ............... | H04M 1/15 |
| | | | | 455/557 |
| 2013/0278215 A1* | 10/2013 | Dea | ............... | H02J 7/0044 |
| | | | | 320/111 |
| 2014/0253038 A1* | 9/2014 | Posa | ............... | H02J 7/0044 |
| | | | | 320/111 |
| 2015/0364875 A1* | 12/2015 | Ginsberg | ............... | H01R 13/72 |
| | | | | 320/114 |
| 2016/0141898 A1* | 5/2016 | Riphin | ............... | H02J 7/0044 |
| | | | | 320/114 |

\* cited by examiner

*Primary Examiner* — Junpeng Chen
(74) *Attorney, Agent, or Firm* — Eldredge Law Firm; Richard G. Eldredge

(57) ABSTRACT

A system for recharging a mobile phone battery. The system includes a phone case configured to secure to the mobile phone; a cord winding mechanism rotatably attached to the phone case and disposed within a first housing; a resistor and regulator assembly disposed within a second housing, the resistor and regulator assembly is configured to regulate the power to a mobile phone battery; and a cord wrapped around the winding mechanism and conductively coupled to the resistor and regulator assembly.

3 Claims, 3 Drawing Sheets

PHONE CASE WITH RETRACTABLE CHARGING SYSTEM

BACKGROUND

1. Field of the Invention

The present invention relates generally to a phone charging system, and more specifically, to a retractable charging system for a phone case.

2. Description of Related Art

Cell phone cases are well known in the art and are effective means to protect the phone from damage during use. FIG. 1 depicts a case 101 having a body 103 contoured similar to the outside surface of a phone (not shown) and configured to securely engage with and protect the phone during use.

Phone charging electrical systems are also well known in the art and are adapted to provide the phone with electrical energy. FIG. 2 depict a conventional charging system 201 having a wall adapter 203 and a phone cord 205. The phone cord 205 includes a USB connector 207 and a phone adapter 209; both being attached to an electrical conductor 211. The wall adapter 203 includes a body 213 with a USB port 217 configured to engage with USB connector 207 and a plurality of metal terminals 215 in communication with the port 217.

During use, the owner will connect the terminals 215 to a wall outlet and engage the USB connector 207 with USB port 217. Thereafter, the owner connects the phone adapter 209 to the phone for charging.

A common problem associated with the above-described process of charging the phone is that the owner will typically carry the charger system 201 during travels, which in turn can create a carrying burden.

Although great strides have been made in the area of phone cases and charging systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
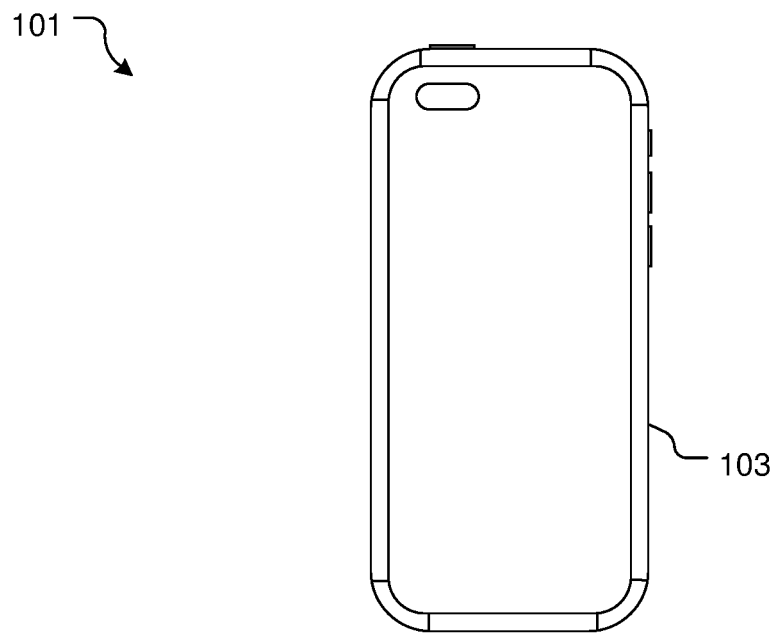
FIG. 1 is a front view of a conventional phone case.
Figure 2:
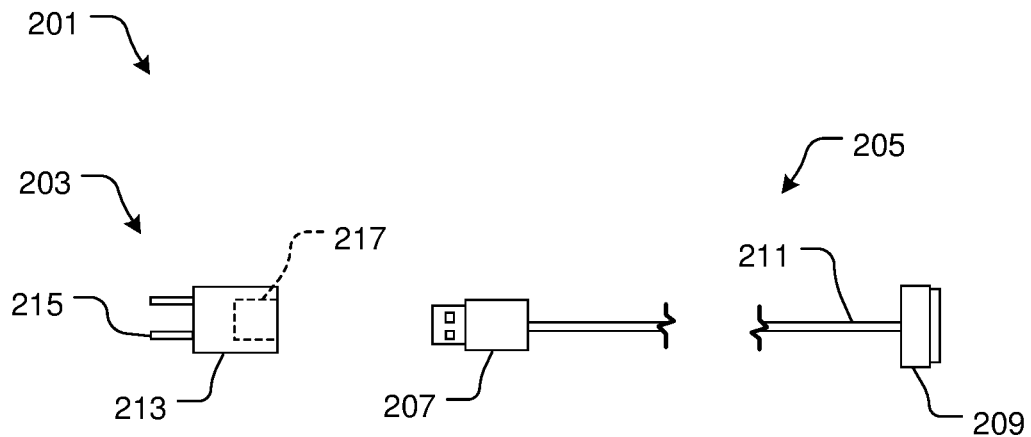
FIG. 2 is a simplified front view of a conventional charging system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional phone cases and charging systems. Specifically, the system and method of the present application provides rapid and effective means to carry and recharge the phone during use. This feature results in significant improvements over existing phone cases. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
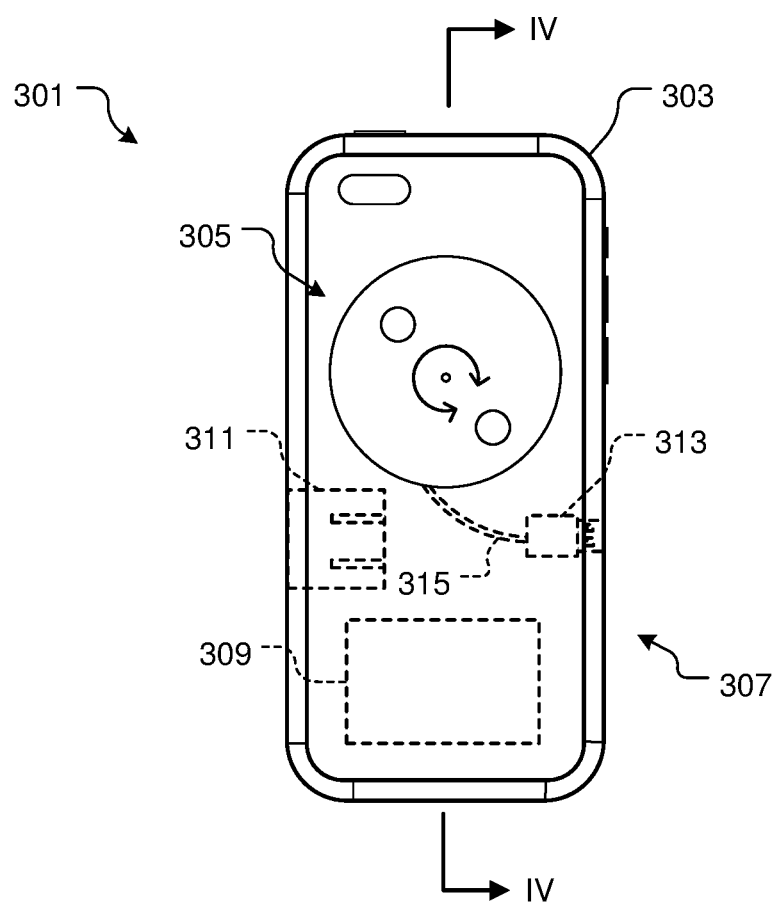
FIG. 3 is a front view of a phone case and charging system in accordance with a preferred embodiment of the present application.
Figure 4:
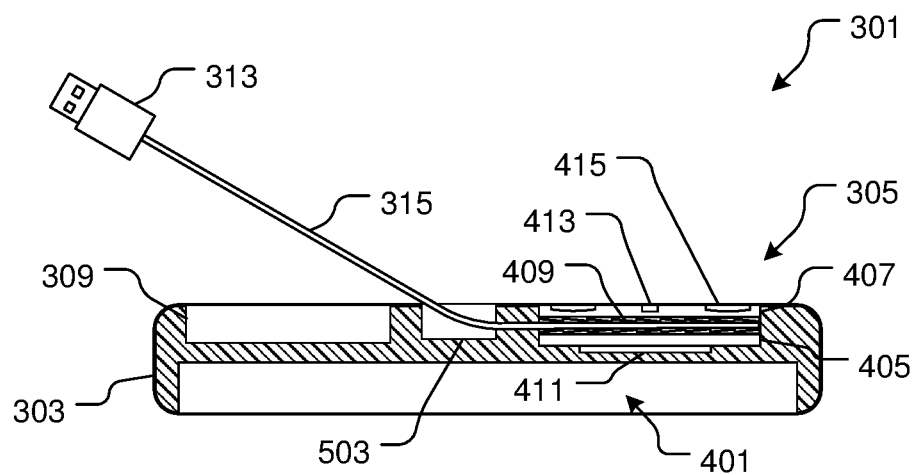
FIG. 4 is a side cross-sectional view of the phone case and charging system of FIG. 3 taken at IV-IV.
Figure 5:
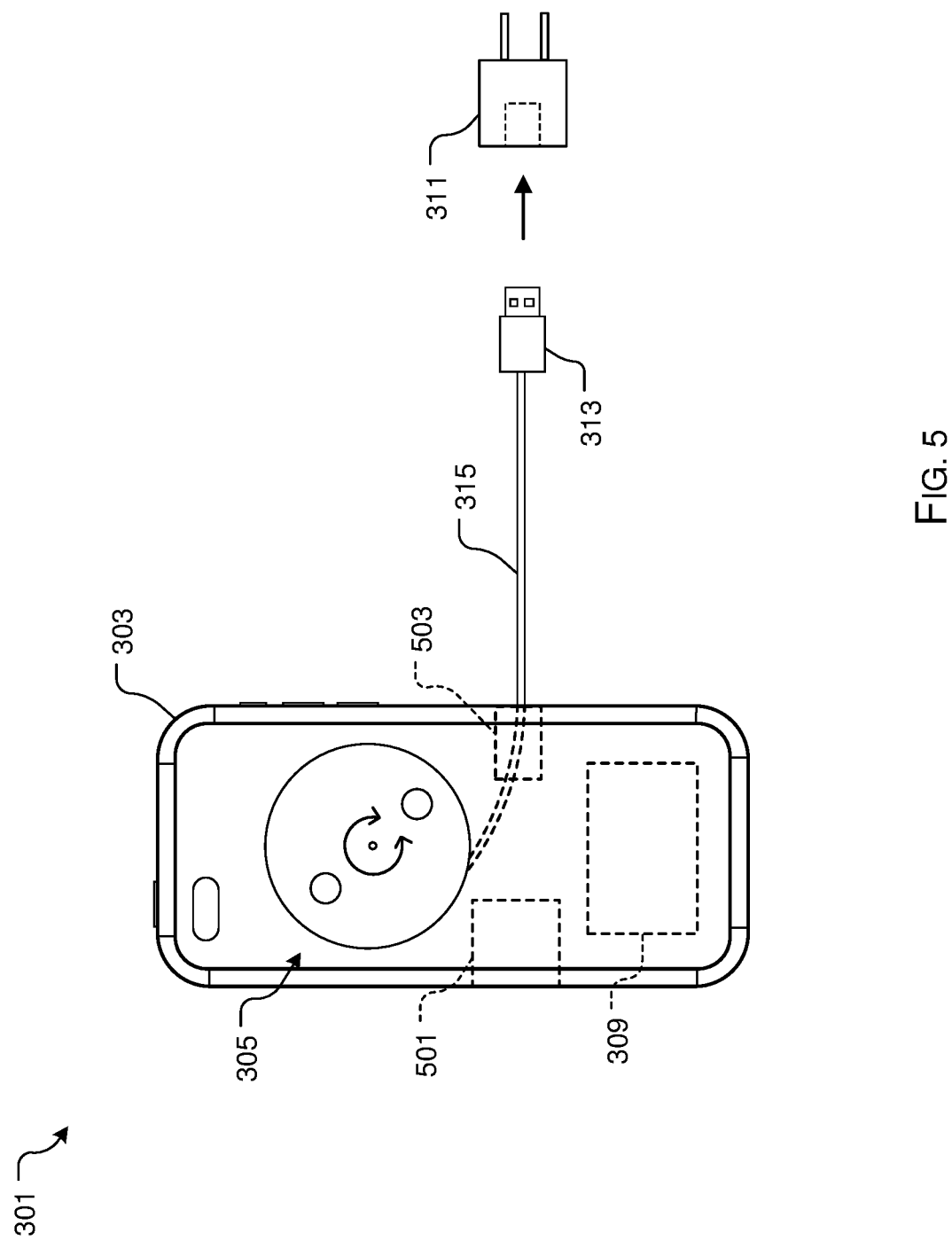
FIG. 5 is a front view of a phone case and charging system of FIG. 3.

Referring now to the drawings wherein like reference characters identify corresponding or similar elements throughout the several views, FIGS. 3-5 depict various views of a system 301 accordance with a preferred embodiment of the present application. It will be appreciated that the phone case and charging system overcomes one of more of the above-listed problems commonly associated with the conventional phone cases and charging systems.

In the contemplated embodiment, system 301 includes a phone case 303 configured to receive a phone (not shown) and adapted to carry a charging device 307. As depicted, one of the unique features believed characteristic of the present application is the ability to carry the charging system 307 in the interior of phone case 303. This feature provides significant advantages over the art.

Charging device 307 includes a cord winding mechanism 305 configured to engage with and store cord 315 operably associated with USB connector 313. Device 307 is further provided with a wall adapter 311 that slidingly engages with an adapter housing 501 disposed within the thickness of body 303. A USB housing 503 is also disposed within the thickness of body 303 and is configured to engage with USB connector 313. Thus, during transit, the USB connector 313 and wall adapter 311 are snugly stored in the thickness of body 303 via respective housings 501, 503 and the cord 315 is wound tightly via winding mechanism 305.

Charging device 307 is further provided with a regulator and resistor assembly 309 operably associated with USB connector 313 and wall adapter 311. During use, the assembly 309 is configured to regulate the inflow of electrical energy to the phone batteries (not shown). Assembly 309 could be configured to regulate the amount of electrical energy in addition to the duration of charge to the batteries.

Referring specifically to FIG. 4, a side cross-sectional view of system 301 are shown taken at IV-IV of FIG. 3. As depicted, body 303 form a cavity 401 configured to receive the phone safely therein. The winding mechanism 305 could include two plates 405, 407 having a plurality of teeth 409 configured to engage with cord 315. In one embodiment, the winding mechanism 305 could include a spring 411 and a release button 413 to achieve auto winding of the cord after use. It is also contemplated having a plurality of finger indentations 415 configured to allow the owner to manually wind the cord 315 after use.

As shown in FIG. 5, the owner pulls cord 315 and USB connector 313 from respective housings 501, 503 and connects the two device to each other prior to engaging the wall adapter 311 to a wall outlet (not shown).

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for recharging a mobile phone battery, comprising:
   a phone case configured to secure to the mobile phone, the phone case having:
      a cavity configured to receive the mobile phone; and
      a first housing;
      a second housing;
      a third housing with an opening; and
      a USB housing with a second opening positioned on the opposite side of the phone case of the opening of the third housing;
   a cord winding mechanism rotatably attached to the phone case and disposed within the first housing;
   a resistor and regulator assembly disposed within the second housing, the resistor and regulator assembly is configured to regulate the power to a mobile phone battery;
   a cord wrapped around the winding mechanism and conductively coupled to the resistor and regulator assembly;
   an independent USB connector stored within the USB housing and configured to connect to the cord, thereby providing a connection for a USB port; and
   a wall adaptor slidingly engaged with the third housing, independently removable from the third housing, and configured to receive the USB connector, thereby providing a connection for a wall outlet;
   wherein electrical energy travels through the cord to the battery via the resistor and regulator assembly.

2. The system of claim 1, the winding mechanism comprising:
   a plurality of finger indentations extending partially through the thickness of a body of the winding mechanism.

3. The system of claim 1, further comprising:
   a spring disposed with the first housing and attached to the winding mechanism.

* * * * *